United States Patent [19]

Toida et al.

[11] Patent Number: 4,707,703

[45] Date of Patent: Nov. 17, 1987

[54] METHOD OF PERFORMING THERMAL MULTICOLOR PRINTING

[75] Inventors: Akikazu Toida; Satoshi Iwata; Fumio Takahashi, all of Ise; Takanobu Mimura, Mie, all of Japan

[73] Assignee: Shinko Electric Co., Ltd., Tokyo, Japan

[21] Appl. No.: 883,127

[22] Filed: Jul. 8, 1986

[30] Foreign Application Priority Data

Jul. 10, 1985 [JP] Japan ............................... 60-151827
Jul. 10, 1985 [JP] Japan ............................... 60-151828

[51] Int. Cl.[4] ............................................ G01D 15/10
[52] U.S. Cl. ................................ 346/1.1; 346/76 PH
[58] Field of Search ........................... 346/1.1, 76 PH

[56] References Cited

U.S. PATENT DOCUMENTS 4,586,834 5/1986 Hachisuga et al. ................. 400/120

*Primary Examiner*—E. A. Goldberg
*Assistant Examiner*—Gerald E. Preston
*Attorney, Agent, or Firm*—Hoffmann, Dilworth, Barrese & Baron

[57] ABSTRACT

A method of thermally printing a multicolor image on a print paper is disclosed. With this method, a lengthy multicolor image can be printed on a paper over a plurality of pages of a length determined by a length of each ink zone of an ink ribbon. First, the ink ribbon is set over a platen roller with the paper being interposed therebetween, the ink ribbon having plural groups of ink zones, the ink zones of each group carrying a plurality of heat-dissolving inks of different colors, respectively. One of the ink zones is positioned at a printing position where a thermal head contacts with the platen roller through the ink ribbon and paper. The thermal head is then activated in accordance with image data stored in a memory, and the ink ribbon and paper are advanced to effect transfer of ink so that one of color component images of the image is printed on the paper. The ink ribbon and paper are then advanced by a predetermined distance to separate the paper from the ink ribbon. The paper is then backwardly moved by a distance equal in length to the total advance of the paper effected in the transferring of ink and the separation of paper. The above operation is cyclicly carried out with respect to the other ink zones to form the multicolor image on the paper without effecting the backward movement in the final cycle. If image data is still present in the memory or if a command for causing the print operation of the image to continue is received, the paper is backwardly moved by a distance substantially equal in length to the advance of paper in the final separation of the paper.

4 Claims, 8 Drawing Figures

METHOD OF PERFORMING THERMAL MULTICOLOR PRINTING

BACKGROUND OF THE INVENTION

1. Field of the Invention

This invention relates to a method of performing thermal multicolor printing on a paper.

2. Prior Art

FIG. 1 is a side elevational view of one conventional thermal transfer type multicolor printer. In FIG. 1, shown at 1 is a print paper with feed holes which engage with sprocket pins *2a* of a pair of paper feed sprocket wheels 2 connected by a shaft *2b*. The paper 1 fed by the sprocket wheels 2 is guided by a pair of guide rollers 3 mounted on opposite ends of a shaft *3a*, wrapped around a platen roller 4 by about 240°, and then extends upward of a paper cutter 5 having a sharp cutting edge. The platen roller 4 is formed at opposite peripheral edge portions thereof with sprocket pins *4a*, and the feed holes of the paper 1 also engage with these sprocket pins *4a*. The platen roller 4 is operatively connected to an output shaft of a drive motor 6 such as a stepping motor, and is also connected to the sprocket wheels 2 through a transmission mechanism such as a timing belt, so that, when driven, the platen roller 4 rotates with the sprocket wheels at the same peripheral speed. Shown at 7 is an ink ribbon which is fed from a supply reel 8, guided by the shaft *3a*, wrapped around the platen roller 4 such that the paper 1 is disposed between this ink ribbon 7 and the peripheral surface of the platen roller 4, guided by guide rollers 9 and 10, and then taken up by a take-up reel 11. This take-up reel 11 is driven by a motor 12 such as a stepping motor.

As shown in FIG. 2, the ink ribbon 7 comprises a base 14 made of a condenser paper, a polyester film or the like which has a width less than the distance between the pair of sprocket wheels 2. A plurality of ink zones *15a*, *15b*, *15c*, *15a*, . . . of the same length l are formed on the base 14 at a predetermined pitch P by applying to one surface thereof wellknown heat-dissolving yellow, magenta and cyan inks, each color ink appearing every three ink zones 15. Provided in each blank portion 16 of the base 14 disposed between adjoining ink zones 15 and 15 is a sensor mark *17a*, *17b* or *17c* for being detected by a photosensor device 18 (FIG. 1), disposed between the rollers 9 and 10, to determine the color of the ink zone which comes immediately after the detected mark. Each of the marks 17 may be a through hole or a metal piece.

The conventional printer is also provided with a retractable thermal head 19 having a plurality of heater elements arranged in a row transversely of the paper 1 for thermally printing a row or a line of dots on the paper 1. The head 19 is urged against the platen roller 4 through the ink ribbon 7 and the paper 1 when an actual printing operation is to be performed, and is retracted from the platen roller 4 when the actual printing operation is not performed, i.e., when the paper 1 is fed in the reverse direction.

The operation of this conventional multi-color printer will now be described with reference to a flow chart shown in FIG. 3.

At first, the paper 1 is set to the printer so that the leading edge of the first page thereof, on which a color image is to be printed, is in agreement with the thermal print head 19. Then, the printer is brought into a printing operation by a depression of a start button (not shown) by the operator, whereupon the motor 12 is driven so that the leading edge of the yellow ink zone *15a* is automatically comes into agreement with the the head 19. Thus, the yellow ink zone *15a* is registered with the page of the paper 1. Thereafter, the heating elements of the head 19 are activated in accordance with data representative of yellow component dots of the multicolor image, and the motors 6 and 12 are driven to feed the paper 1 and the ribbon 7 in steps in the forward direction in unison with each other to thereby print the yellow component dots on the page of the paper 1 (step SP1). When the printing operation of the yellow component dots is completed, the paper 1 and the ink ribbon 7 are in adhered relation to each other due to the dissolved ink at that portions disposed between the thermal head 19 and the guide roller 9. To separate the paper 1 from the ink ribbon 7, the paper 1 and the ribbon 7 are further advanced by a predetermined distance (step SP2). When this further advance is completed, the leading edge of the magenta ink zone *15b* is in agreement with the head 19. Then, the motor 6 is driven so as to rotate in the reverse direction to thereby move the paper 1 backwardly to the initial position where the leading edge of the page thereof is in registry with the head 19. Then, the printing of the magenta component dots of the image is performed in a manner described for the printing of the yellow component dots (step SP3), and after this the separation of the ink ribbon 7 from the paper 1 is effected (step SP4). Then, the paper 1 is again fed backwardly, and subsequently the printing of the cyan component dots of the image is performed (step SP5). The paper 1 is then separated from the ink ribbon 7 (step SP6) by further feeding them in the forward direction, whereupon the multicolor printing of the image on the page is completed. Then, the paper 1 is further fed in the forward direction so that the trailing edge of the printed page reaches the cutting edge of the paper cutter 5 to terminate the printing operation (step SP7).

As will be appreciated from the foregoing, it is essential for the multicolor thermal printer to separate the print paper 1 from the ink ribbon 7 by forwardly feeding both of the paper and ink ribbon (steps SP2, SP4 and SP6), and the length of each ink zone is restricted. As a result, when printing over a plurality of consecutive pages is performed, a blank of a predetermined length is left at each boundary between adjoining pages. This is undesirable particularly when the printer is used in place of a pen-type recorder, that is, when it is required to print one lengthy color image over a plurality of pages of a print paper. To enable the printer to print one lengthy color image, the ink ribbon may be modified to have ink zones greater in length. However, such ink ribbon is liable to be subject to wrinkle.

SUMMARY OF THE INVENTION

It is therefore an object of the present invention to provide a method of performing a multicolor thermal printing on a paper over a plurality of pages without leaving any blanks between adjoining pages.

According to an aspect of the invention, there is provided a method of thermally printing a multicolor image on a print paper in accordance with image data stored in memory means comprising the steps of (a) setting an ink ribbon over a platen roller with the print paper being interposed therebetween, the ink ribbon having plural groups of ink zones of the same length, the ink zones of each group carrying in a predetermined order a predetermined number of heat-dissolving inks of predetermined different colors, respectively, said ink zones being spaced from one another along a length of said ink ribbon by a predetermined distance; (b) subsequently positioning one of said ink zones in one of the groups at a printing position where a thermal head is in contact with said platen roller through said ink ribbon and print paper; (c) subsequently activating said thermal head in accordance with the image data and advancing said ink ribbon and print paper to transfer the ink of said one of the ink zones onto the print paper so that one of color component images constituting the multicolor image is printed on the paper; (d) subsequently advancing said ink ribbon and print paper by a predetermined distance to separate said paper from the ink ribbon adhered to the paper by the dissolved ink; (e) then, backwardly moving said print paper by a distance equal in length to the total advance of said paper in the steps (c) and (d); (f) cyclicly carrying out the steps (b) to (e) with respect to the other ink zones in said one of the groups of ink zones to print the other color component images of the multicolor image on said paper in registered relation to said one of the color component images, without carrying out the step (e) in the final cycle; (g) then, backwardly moving said print paper by a distance substantially equal in length to the advance of said paper in the step (d), when the memory means still stores image data in accordance with which another multicolor image is to be printed.

According to another aspect of the invnention, there is provided a method of thermally printing a multicolor image on a print paper in accordance with image data stored in memory means comprising the steps of (a) setting an ink ribbon over a platen roller with the print paper being interposed therebetween, the ink ribbon having plural groups of ink zones of the same length, the ink zones of each group carrying in a predetermined order a predetermined number of heat-dissolving inks of predetermined different colors, respectively, said ink zones being spaced from one another along a length of said ink ribbon by a predetermined distance; (b) subsequently positioning one of said ink zones in one of the groups at a printing position where a thermal head is in contact with said platen roller through said ink ribbon and print paper; (c) subsequently activating said thermal head in accordance with the image data and advancing said ink ribbon and print paper to transfer the ink of said one of the ink zones onto the print paper so that one of color component images constituting the multicolor image is printed on the paper; (d) subsequently advancing said ink ribbon and print paper by a predetermined distance to separate said paper from the ink ribbon adhered to the paper by the dissolved ink; (e) then, backwardly moving said print paper by a distance equal in length to the total advance of said paper in the steps (c) and (d); (f) cyclicly carrying out the steps (b) to (e) with respect to the other ink zones in said one of the groups of ink zones to print the other color component images of the multicolor image on said paper in registered relation to said one of the color component images, without carrying out the step (e) in the final cycle; (g) then, backwardly moving said print paper by a distance substantially equal in length to the advance of said paper in the step (d) when a command for printing another multicolor image in joined relation to the printed multicolor image by the steps (b) to (f) is received.

DESCRIPTION OF THE PREFERRED EMBODIMENTS OF THE INVENTION

Figure 1:
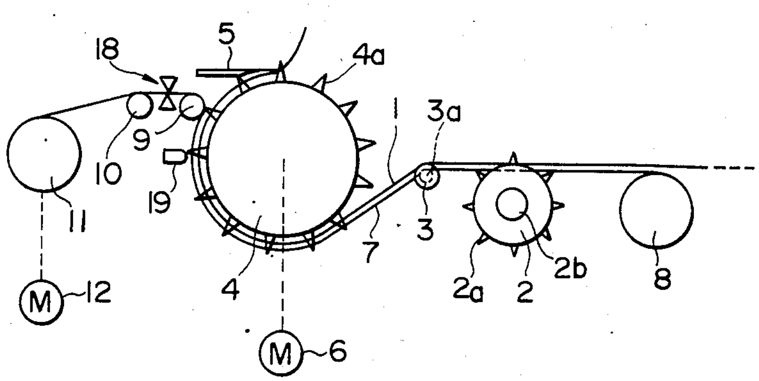
FIG. 1 (PRIOR ART)
FIG. 1 is a diagrammatic illustration showing a conventional thermal transfer type multicolor printer.
Figure 2:
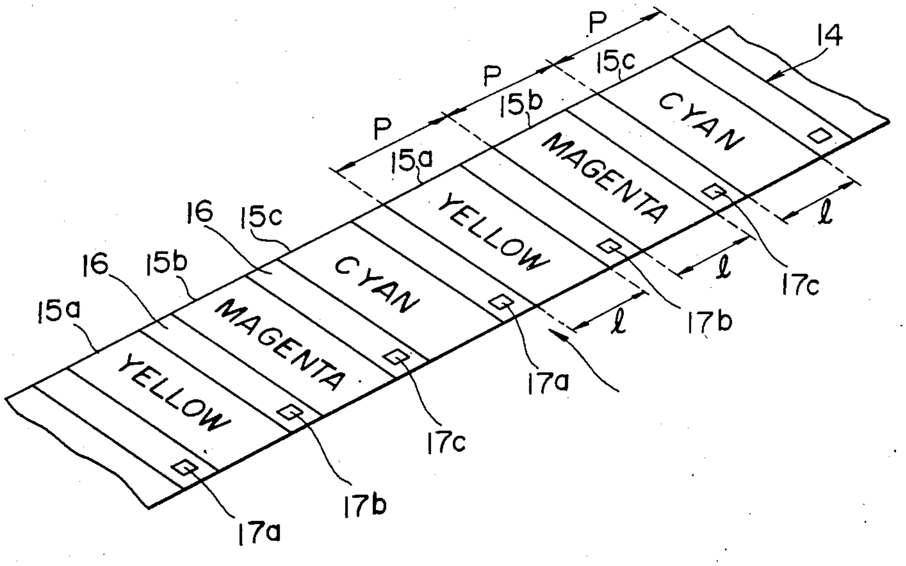
FIG. 2 (PRIOR ART)
FIG. 2 is an illustration showing an arrangement of the ink ribbon 7 for the printer of FIG. 1.
Figure 3:
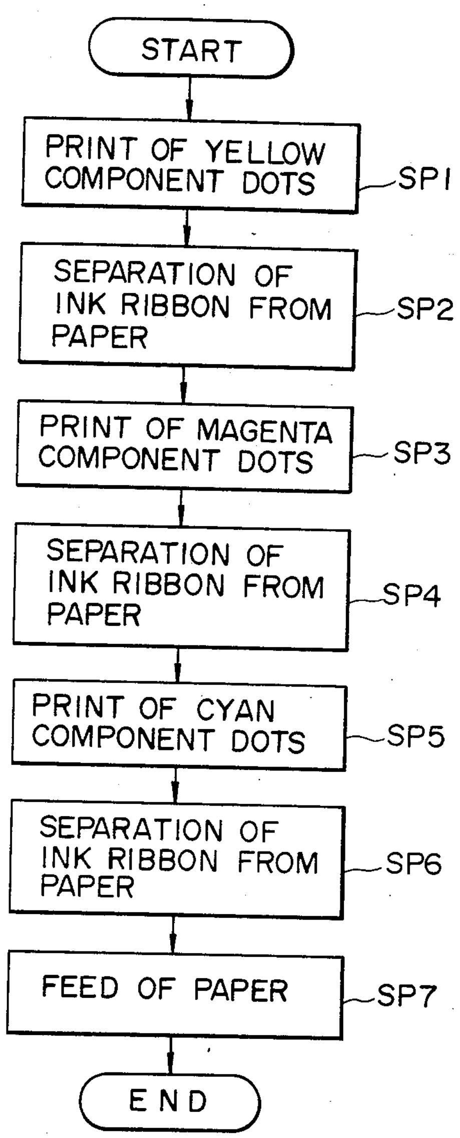
FIG. 3 (PRIOR ART)
FIG. 3 is a flow chart showing the operation of the printer of FIG. 1.
Figure 4:
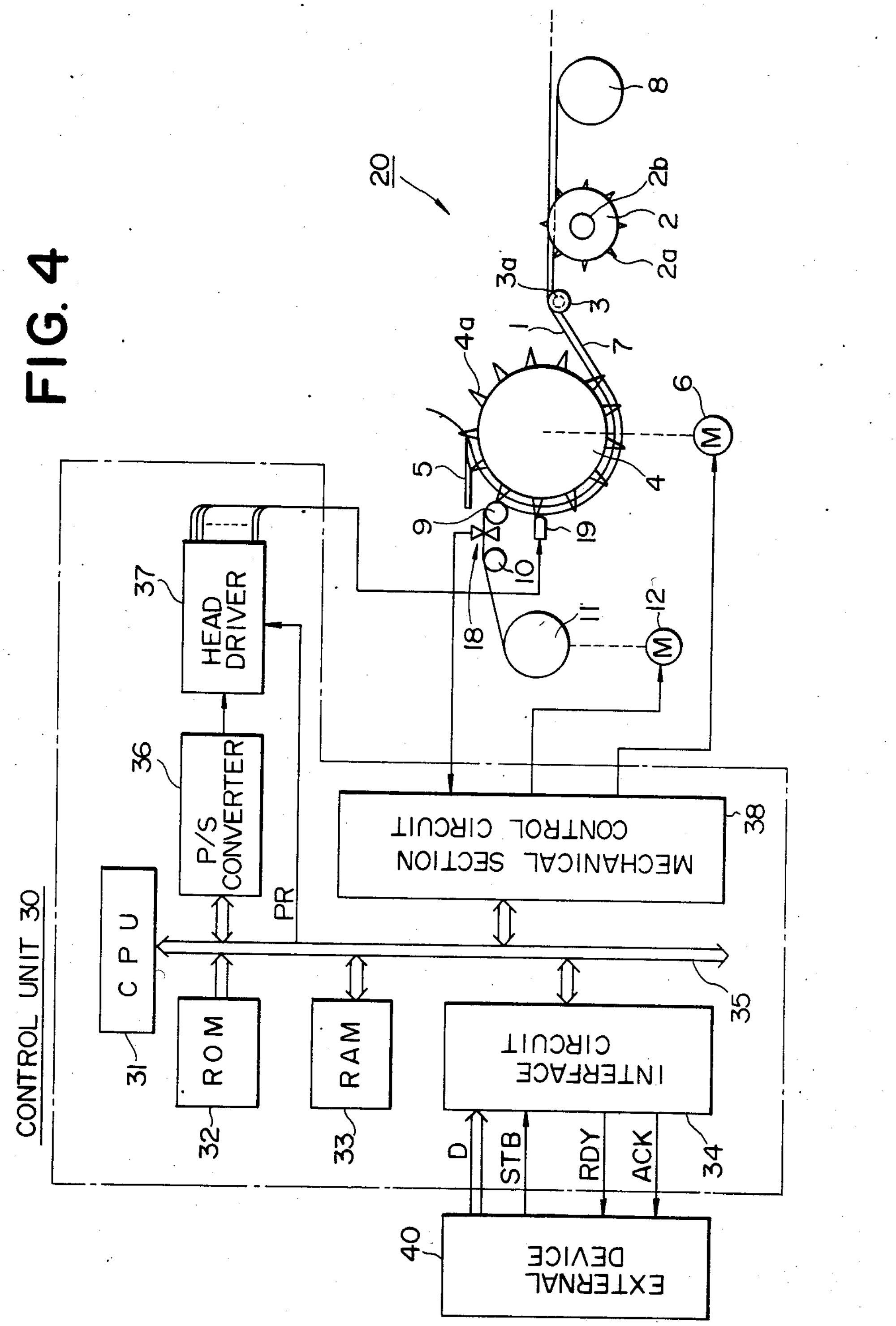
FIG. 4 is a diagrammatic illustration showing a thermal transfer type multicolor printer to which a printing method according to the present invention is applied.

Now referring to FIG. 4, there is shown a thermal transfer type multicolor printer to which a printing method according to the present invention is applied. The printer comprises a printing section 20, which is identical in structure to that shown in FIG. 1, and a control unit 30. The control unit 30 includes a central processing unit (CPU) 31 such as a microprocessor unit, a read only memory (ROM) 32 storing control programs executed by the CPU 31, a random access memory (RAM) 33 for storing image data representative of dots of each color component image of a multicolor image to be printed on the print paper 1 and an interface circuit 34 for communication with an external device 40 such as a computer unit with a CRT display unit. The RAM 33 may have a capacity enough to store the image data of a row or a line of dots on the print paper 1. The interface circuit 34 is based on the Centronics standards and sends a ready signal RDY to the external device 40 to receive therefrom image data D of one byte together with a strobe signal STB. In response to the strobe signal STB, the interface circuit 34 stores the received image data D thereinto, outputs the stored image data D onto a signal bus 35, and then sends an acknowledge signal ACK to the external device 40. Also connected to the signal bus 35 is a parallel-to-serial converter (P/S converter) 36 which converts 8-bit parallel data fed thereto from the signal bus 35 into a serial data and supplies this serial data to a head driver 37. The head driver 37 comprises a serial-to-parallel converting shift register composed of serially connected flip-flops identical in number to the heater elements of the retractable thermal head 19 and gate circuits for controlling the application of the respective outputs of the flip-flops of the shift register to the heater elements of the head 19. The control unit 30 also comprises a mechanical section control circuit 38 which receives an output signal of the photosensor device 18 and drives under the control of the CPU 31 the motor 6 for rotating the sprocket wheels 2 and the platen roller 4 and the motor 12 for rotating the take-up reel 11 of the ink ribbon 7.

Figure 5:
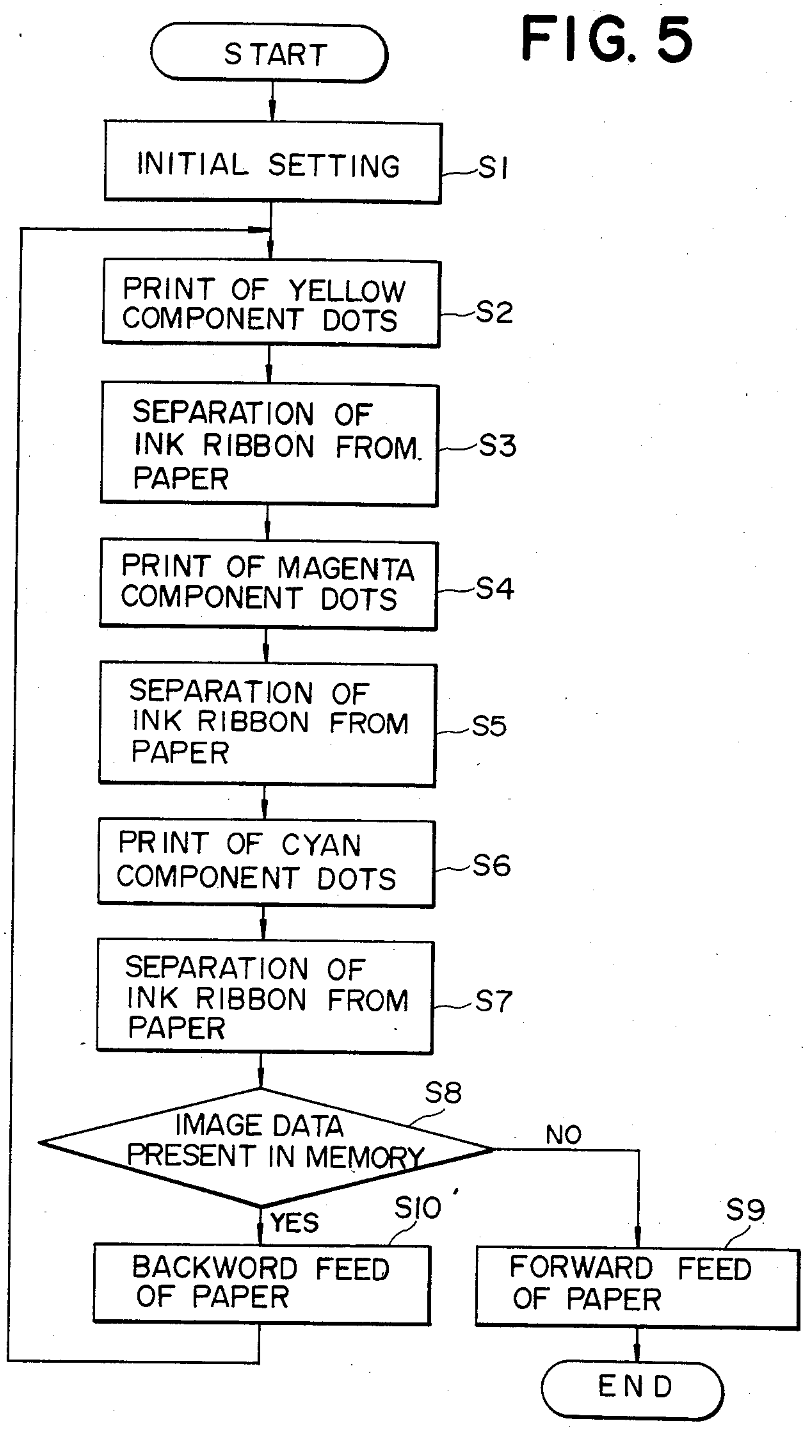
FIG. 5 is a flow chart showing the operation of the printer of FIG. 4.

The operation of this printer will now be described with reference to a flow chart shown in FIG. 5.

When a print start button (not shown) of this printer is depressed by the operator, the CPU 31 detects the depression and carries out an initial setting processing at step S1. More specifically, the CPU 31 causes the interface circuit 34 to output the ready signal RDY to the external device 40. The external device 40 receives this ready signal RDY and outputs to the interface circuit 34 a series of image data D constituting yellow component dots of the color image to be printed on the first line of the first page of the paper 1 on a byte basis. The series of image data D thus supplied to the interface circuit 34 are successively written into the RAM 33 by the CPU 31. The CPU 31 then outputs a paper setting command to the mechanical section control circuit 38 to cause it to drive the stepping motor 6 by a predetermined number of steps, whereby the platen roller 4 and the sprockets wheels 2 are rotated to move the print paper 1 to an initial position where the first line portion of a page of the paper 1 is in registry with the head 19. The CPU 31 then outputs an ink ribbon setting command to the mechanical section control circuit 38, whereupon the mechanical section control circuit 38 drives the motor 12 in accordance with the signal from the photosensor device 18 so that the ink ribbon 7 is moved to the position where the leading edge portion of the yellow ink zone 15a is in registry with the head 19. At step S2, the CPU 31 effects processing for yellow color printing. More specifically, the CPU 31 sequentially reads the image data D representative of the yellow component dots of the image from the RAM 33 and supplies them to the P/S converter 36. When the RAM 33 becomes empty, the CPU 31 requests the external device 40 through the interface circuit 34 to send the yellow component dot data for the next line of the first page of the paper 1. The P/S converter 36 converts each of the image data D supplied from the CPU 31 into a serial data and supplies it to the head driver 37. The serial data thus supplied from the P/S converter 36 is fed into the shift register thereof. Then, when the shift register of the head driver 37 is filled with the serial image data corresponding to the first row of dots, the CPU 31 outputs a print command signal PR to the head driver 37. As a result, the gate circuits in the head driver 37 open to supply the outputs of the flip-flops of the shift register respectively to the heater elements of the head 19, whereby the first row of yellow component dots of the image is printed on the paper 1. Subsequently, the CPU 31 causes the mechanical section control circuit 38 to drive the motors 6 and 12 so that each of the paper 1 and the ink ribbon 7 is advanced at the same speed by an amount which corresponds to a distance between adjoining rows of dots. The CPU 31 then reads the image data D corresponding to the second row of yellow component dots of the image from the RAM 33, and causes the second row of dots to be printed on the paper 1 in accordance with the read image data D. And thereafter, an operation similar to the above is repeatedly carried out to print all of the yellow component dots of the image on the first page of the print paper 1.

Then, the processing by the CPU 31 proceeds to step S3, at which the CPU 31 outputs to the mechanical section control circuit 38 a command for separating the paper 1 from the ink ribbon 7. The mechanical section control circuit 38 drives, in response to this command, each of the motors 6 and 12 to rotate by a predetermined number of steps to thereby advance the paper 1 and the ink ribbon 7 at the same speed by such an amount that the trailing edge of the printed page passes past the guide roller 9 and reaches the cutting edge of the paper cutter 5. As a result, the paper 1 is separated from the ink ribbon 7, and the leading edge portion of the magenta ink zone **15*b* of the ink ribbon 7 is brought into agreement with the head 19. Then the processing proceeds to step S4, at which printing of the magenta component dots of the image on the same page of the paper 1 is effected. More specifically, the CPU 31 first causes the mechanical section control circuit 38 to drive the motor 6 to feed the paper 1 backwardly so that the leading edge of the current page of the paper 1 comes into registry with the head 19. Then, the CPU 31 sequentially reads the image data representative of the magenta component dots of the image and supplied them to the P/S converter 36, so that the printing of the magenta component dots is performed on the same page of the paper 1 in a manner described for the printing of the yellow component dots at the step S2. When the printing of the magenta component dots is completed, the processing proceeds to the next step S5 at which the separation of the paper 1 from the ink ribbon 7 is carried out in a manner described for the separation at the step S3. Then, the processing proceeds to step S6 to effect printing of the cyan component dots of the image on the same page of the paper 1. When the printing of the cyan component dots on the first page of the paper 1 is completed, the CPU 31 causes the interface circuit 34 to output the ready signal RDY to store the image data D representative of the yellow component dots to be printed on the first line of the next page into the RAM 33. At the next step S7, the paper 1 is separatd from the ink ribbon 7 in a manner described for the steps S3 and S5. Thus, printing of the multicolor image on the first page of the paper 1** is completed.

At step S8, the CPU 31 determines whether further image data D, in accordance with which printing of dots on the first line of the second page is to be effected, are present in the RAM 33. if the result of the determination at this step S8 is "NO", then the processing proceeds to step S9 at which the CPU 1 causes the paper 1 to be fed by a predetermined amount to terminate the printing operation. On the other hand, if the result of the determination at the step S8 is "YES", then the processing proceeds to step S10. At this step S10, the CPU 31 outputs a backward feed command to the mechanical section control circuit 38 to drive the motor 6 so that the paper 1 is backwardly fed by such an amount that the portion of the paper 1 which corresponds to the next row of dots of the last row of dots on the first page comes in registry with the head 19. In this case, the space between the above next row of dots and the last row of dots on the first page is equal in length to those between adjoining rows of dots on the first page, and the above next row of dots is the first row of dots of the second page of the paper 1. The processing then returns to the step S2 whereupon printing of color dots of the next image begins to be effected on the second page of the paper 1.

Figure 6:
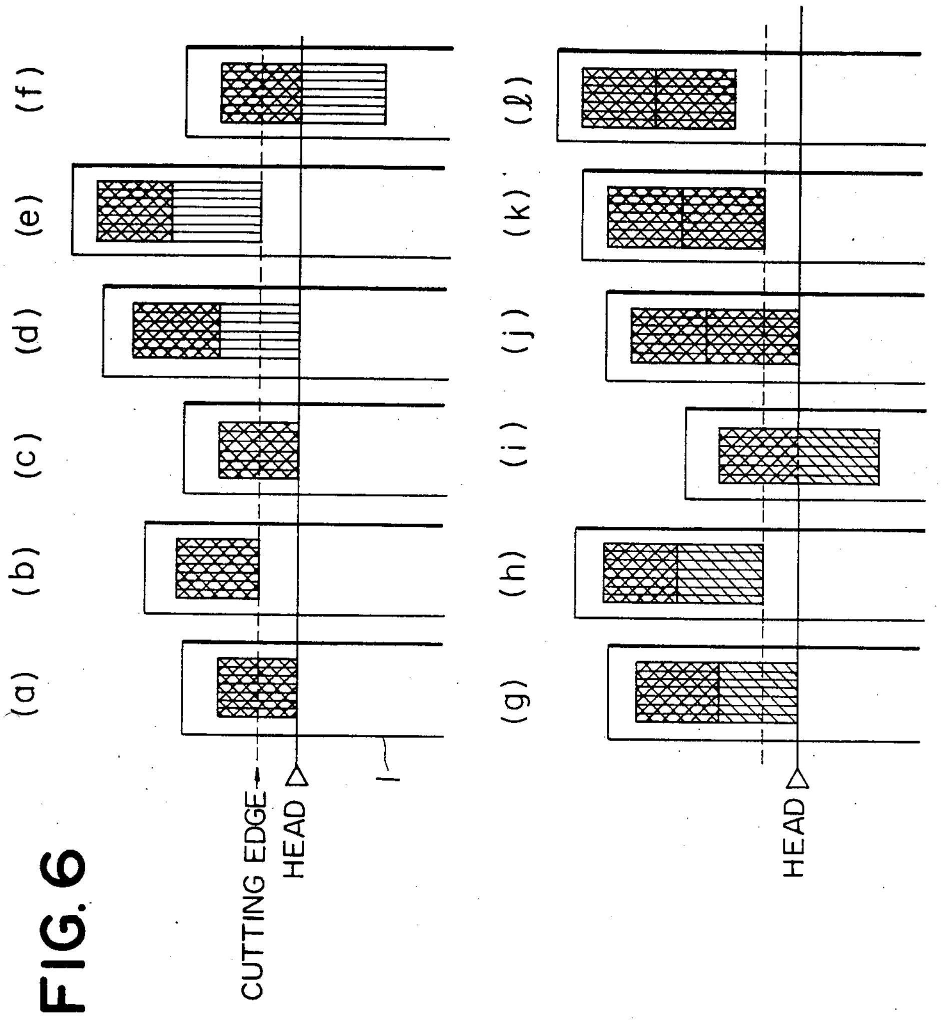
FIG. 6 is an illustration showing the variation of the relationship between the printed image and the paper position.

The process of printing of the multicolor images on the paper 1 over two pages is more illustratively shown in FIG. 6, wherein each of the illustrations identified by alphabetic reference characters represents the image printed on the paper 1 at the end of a respective one of the following steps identified by like reference characters:

(a) print of the cyan component dots on the first page;
(b) separation of the paper 1 from the ink ribbon 7;

(c) backward feed of the paper 1 of the print on the next or the second page;

(d) print of the yellow component dots on the second page;

(e) separation of the paper 1 form the ink ribbon 7;

(f) backward feed of the paper 1 for the print of the magenta component dots on the second page;

(g) print of the magenta component dots on the second page;

(h) separation of the paper 1 from the ink ribbon 7;

(i) backward feed of the paper 1 for the print of the cyan component dots on the second page;

(j) print of the cyan component dots on the second page;

(k) separation of the paper 1 from the ink ribbon 7; and (l) forward feed of the paper 1 to terminate the printing operation.

It will be readily understood from the foregoing that print of a multicolor image over more than two consecutive pages can be effected by repeatedly carrying out the steps (a) to (1).

Another thermal transfer type multicolor printer to which a modified method according to the present invention is applied will now be described.

Figure 7:
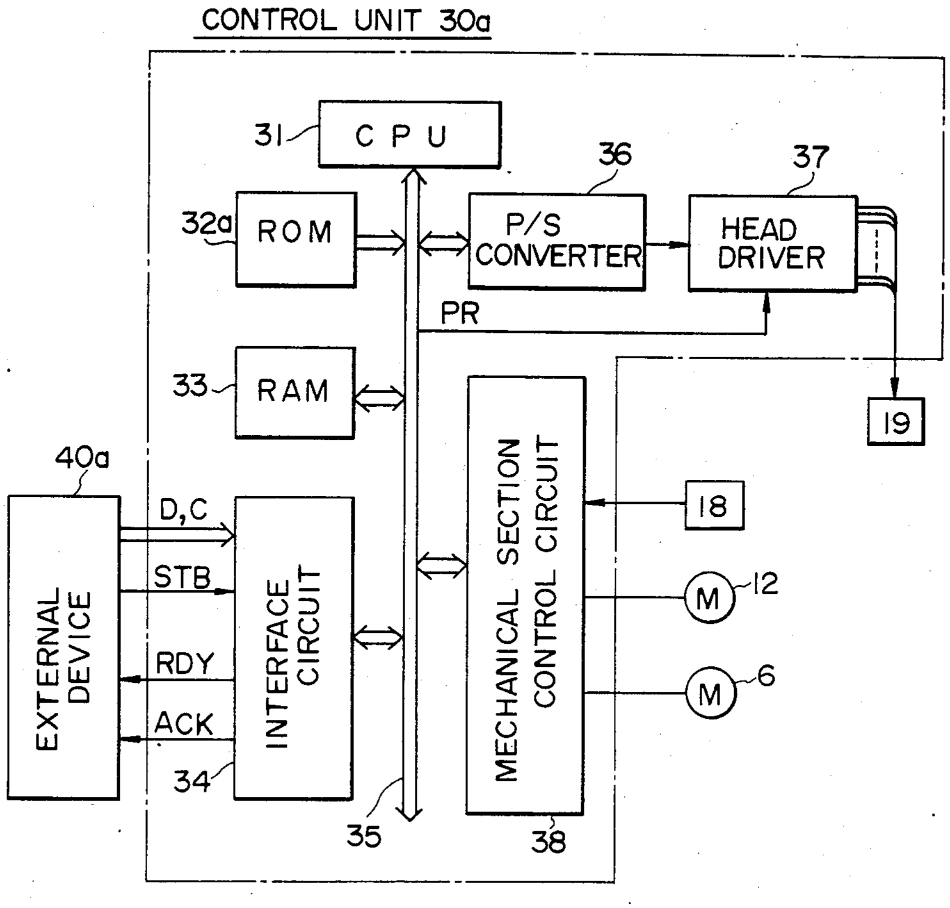
FIG. 7 is a diagrammatic illustration showing another thermal transfer type multicolor printer to which a modified printing method according to the present invention is applied.

This printer is similar in arrangement to the printer of FIG. 4 and differs therefrom only in the following respects. As shown in FIG. 7, a control unit 30*a* of this printer is connected to an external device 40*a* which is similar in construction to the external device 40 shown in FIG. 4 but differs therefrom in that it outputs, after outputting the last image data D for the current page and before outputting the first image data D for the next page, a control data C indicating whether the next page must be printed in joined relation to the current page. A ROM 32*a* connected to the signal bus 35 of this control unit 30*a* stores a modified control program to be executed by the CPU 31, as later described.

Figure 8:
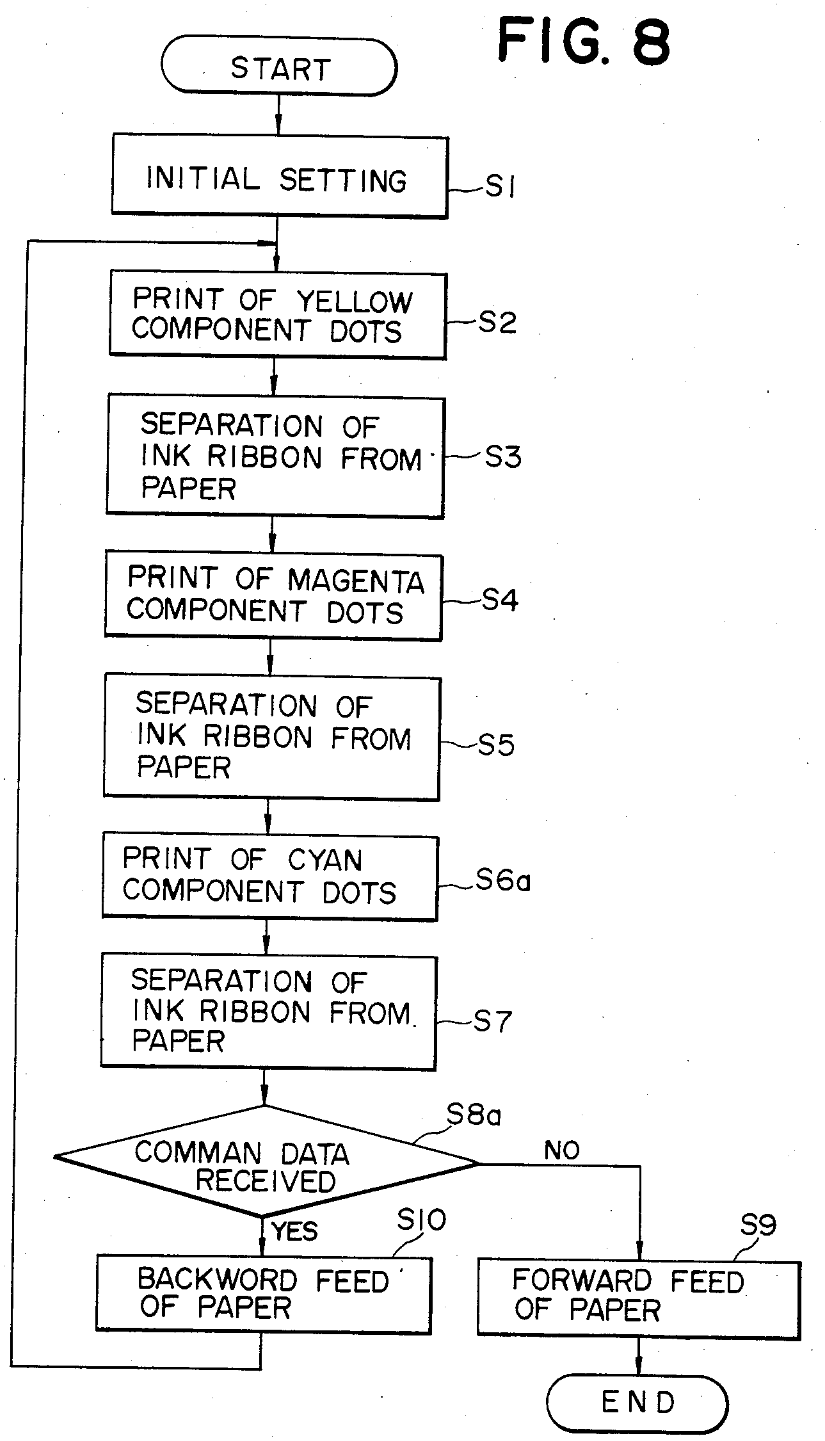
FIG. 8 is a flow chart showing the operation of the printer of FIG. 7.

The operation of this modified printer will now be described with reference to a flow chart shown in FIG. 8.

This flow chart differs from that of FIG. 5 in the following respects. At step S6*a,* when the printing of the cyan component dots of the image on the first page of the paper 1 has been completed, the RAM 33 becomes empty whereupon the CPU 31 requests the external device 40*a* to send the next image data D. In this case, if the external device 40*a* has image data D for the next page, it sends, instead of the image data D of the first yellow component dot for the next page, the control data C indicating that the next page is to be printed on the paper 1 in joined relation to the first page. At step S8*a,* the CPU 31 determines in accordance with the control data C whether the next page must be printed in joined relation to the first page. If the result of the determination is "YES", the CPU 31 requests the external device 40*a* to send the image data D for the next page, and then the processing proceeds to the step S10. On the other hand, the result of the determination at the step S8*a* is "NO", then the processing proceeds to the step S9.

With this modified printer, one lengthy multicolor image can also be printed on the paper 1 over a plurality of pages without blanks, as shown in FIG. 6.

What is claimed is:

1. A method of thermally printing a multicolor image on a print paper in accordance with image data stored in memory means comprising the steps of:

(a) setting an ink ribbon over a platen roller with the print paper being interposed therebetween, the ink ribbon having plural groups of ink zones of the same length, the ink zones of each group carrying in a predetermined order a predetermined number of heat-dissolving inks of predetermined different colors, respectively, said ink zones being spaced from one another along a length of said ink ribbon by a predetermined distance;

(b) subsequently positioning one of said ink zones in one of the groups at a printing position where a thermal head is in contact with said platen roller through said ink ribbon and print paper;

(c) subsequently activating said thermal head in accordance with the image data and advancing said ink ribbon and print paper to transfer the ink of said one of the ink zones onto the print paper so that one of color component images constituting the multicolor image is printed on the paper;

(d) subsequently advancing said ink ribbon and print paper by a predetermined distance at the same speed to separate said paper from the ink ribbon adhered to the paper by the dissolved ink;

(e) then, backwardly moving said print paper by a distance equal in length to the total advance of said paper in the steps (c) and (d);

(f) cyclicly carrying out the steps (b) to (e) with respect to the other ink zones in said one of the groups of ink zones to print the other color component images of the multicolor image on said paper in registered relation to said one of the color component images, without carrying out the step (e) in the final cycle; and (g) then, backwardly moving said print paper by a distance substantially equal in length to the advance of said paper in the step (d), when the memory means still stores image data in accordance with which another multicolor image is to be printed.

2. A method according to claim 1, wherein said ink zones of each group carries yellow, magenta and cyan heat-dissolving inks, respectively.

3. A method of thermally printing a multicolor image on a print paper in accordance with image data stored in memory means comprising the steps of:

(a) setting an ink ribbon over a platen roller with the print paper being interposed therebetween, the ink ribbon having plural groups of ink zones of the same length, the ink zones of each group carrying in a predetermined order a predetermined number of heat-dissolving inks of predetermined different colors, respectively, said ink zones being spaced from one another along a length of said ink ribbon by a predetermined distance;

(b) subsequently positioning one of said ink zones in one of the groups at a printing position where a thermal head is in contact with said platen roller through said ink ribbon and print paper;

(c) subsequently activating said thermal head in accordance with the image data and advancing said ink ribbon and print paper to transfer the ink of said one of the ink zones onto the print paper so that one of color component images constituting the multicolor image is printed on the paper;

(d) subsequently advancing said ink ribbon and print paper by a predetermined distance at the same speed to separate said paper from the ink ribbon adhered to the paper by the dissolved ink;

(e) then, backwardly moving said print paper by a distance equal in length to the total advance of said paper in the steps (c) and (d);

(f) cyclicly carrying out the steps (b) to (e) with respect to the other ink zones in said one of the groups of ink zones to print the other color component images of the multicolor image on said paper in registered relation to said one of the color component images, without carrying out the step (e) in the final cycle; and (g) then, backwardly moving said print paper by a distance substantially equal in length to the advance of said paper in the step (d) when a command for printing another multicolor image in joined relation to the printed multicolor image by the steps (b) to (f) is received.

4. A method according to claim 3, wherein said ink zones of each group carries yellow, magenta and cyan heat-dissolving inks, respectively.

* * * * *